United States Patent
Delighiannis

(12)
(10) Patent No.: US 6,322,701 B1
(45) Date of Patent: Nov. 27, 2001

(54) WATER TREATMENT PROCESS

(75) Inventor: Andreas Th Delighiannis, Thessaloniki (GR)

(73) Assignee: Thocar Ltd., Douglas Isle of Man (GB)

(*) Notice: Subject to any disclaimer, the term of this patent is extended or adjusted under 35 U.S.C. 154(b) by 0 days.

(21) Appl. No.: 09/297,487

(22) PCT Filed: Nov. 7, 1997

(86) PCT No.: PCT/GB97/03067

§ 371 Date: Jun. 16, 1999

§ 102(e) Date: Jun. 16, 1999

(87) PCT Pub. No.: WO98/21149

PCT Pub. Date: May 22, 1998

(30) Foreign Application Priority Data

Nov. 8, 1996 (GR) .................................................. 9623337

(51) Int. Cl.$^7$ ...................................................... C02F 1/52
(52) U.S. Cl. .......................... 210/620; 205/745; 210/626; 210/631; 210/713; 210/716; 210/719; 210/721; 210/724; 210/726; 210/903; 210/906; 210/909; 210/917; 210/928
(58) Field of Search .................................... 210/702, 713, 210/714, 716, 719, 720, 721, 722, 724, 726, 727, 757, 908, 909, 928, 912–914, 917, 620, 626, 903, 631, 906; 205/745

(56) References Cited

U.S. PATENT DOCUMENTS

| 2,897,150 | 7/1959 | Bencowitz ............................. 210/63 |
| 3,575,853 | * 4/1971 | Gaughan et al. ....................... 210/46 |

(List continued on next page.)

FOREIGN PATENT DOCUMENTS 2079282   9/1992   (CA) .
0044058   1/1982   (EP) .
0151120   8/1985   (EP) .

(List continued on next page.)

OTHER PUBLICATIONS

Dr. H. Jung, Viersen, Ein Beitrag zur Reinigung der Abwasser der Textil und Lederindustrie (Niersverfahren). Ber. Abwassertechn. Vergg 3(1952)95.

(List continued on next page.)

*Primary Examiner*—Peter A. Hruskoci
(74) *Attorney, Agent, or Firm*—Ladas & Parry

(57) ABSTRACT

A process for the treatment of waste waters containing chemically reducible dissolved organic and inorganic pollutants and suspended mater in particulate or colloidal form. The process comprises of contacting the water with metallic iron or ferrous ions ($Fe^{2+}$), or mixtures thereof, in the presence of promoter metals, such as Cu, Pd, Pt, Au, Ag, and Ni, or oxides, sulfides and other insoluble compounds of these meals, which catalyze the redox reductions carried out by the iron or ferrous reagents. The production of ferric ions ($Fe^{3+}$) as a final iron oxidation product allows for the simultaneous coagulation and precipitation of suspended colloidal and particulate solids out of the aqueous phase. In addition to the main reductive reaction scheme, the system performs a multitude of secondary reactions involving the ferrous and ferric ions produced in-situ which allows for the simultaneous removal of specific target pollutants, such as phosphate and hydrogen sulfide. The net effect of a treatment in accordance to this invention is the decrease in a wide range of carbonaceous, nitrogenous and other targeted pollutants present in a waste water stream in a dissolved, colloidal or particulate form and the chemical conversion, commonly referred to as "softening", of non-readily biodegradable pollutants through a generally complex set of reactions and physical processes. As a result, the implementation of the process prior to or in parallel to conventional biological treatment makes the latter more feasible, more efficient, more economical in terms of both capital investment and operating cost and, also, the anally discharged water more compatible with environmental demands.

9 Claims, 2 Drawing Sheets

U.S. PATENT DOCUMENTS

Figure 1:
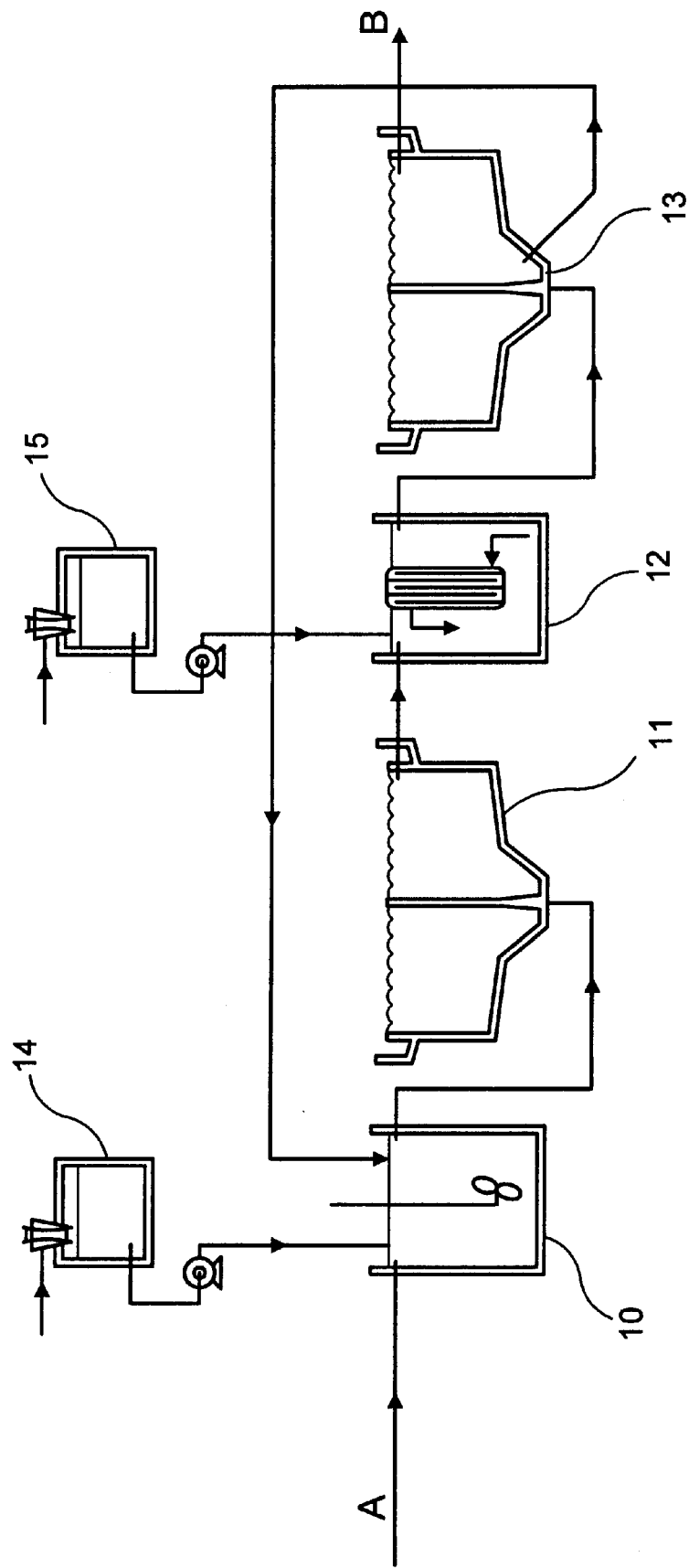

| | | | | |
|---|---|---|---|---|
| 3,763,038 | * | 10/1973 | Misaka et al. | 210/631 |
| 3,796,637 | | 3/1974 | Fusey | 195/100 |
| 4,019,952 | | 4/1977 | Ploetz et al. | 162/29 |
| 4,194,973 | * | 3/1980 | Smith | 210/50 |
| 4,219,419 | * | 8/1980 | Sweeny | 210/59 |
| 4,548,718 | | 10/1985 | Muir | 210/719 |
| 4,606,829 | | 8/1986 | Rice et al. | 210/713 |
| 4,614,587 | | 9/1986 | Andersson et al. | 210/603 |
| 4,642,192 | * | 2/1987 | Heskett | 210/758 |
| 4,740,244 | | 4/1988 | Williams | 75/109 |
| 4,940,549 | | 7/1990 | Olsen et al. | 210/695 |
| 5,198,118 | | 3/1993 | Heskett | 210/638 |
| 5,411,664 | | 5/1995 | Seech et al. | 210/602 |
| 5,545,331 | * | 8/1996 | Guess | 210/713 |
| 5,575,919 | | 11/1996 | Santina | 210/695 |
| 5,744,045 | * | 4/1998 | Yuen | 210/719 |
| 5,853,598 | * | 12/1998 | Ogoshi et al. | 210/724 |
| 5,879,555 | * | 3/1999 | Khudenko | 210/615 |

FOREIGN PATENT DOCUMENTS

| | | |
|---|---|---|
| 0202382 | 11/1986 | (EP) . |
| 0514177 | 11/1992 | (EP) . |
| 0595441 | 5/1994 | (EP) . |
| 9620137 | 7/1996 | (WO) . |

OTHER PUBLICATIONS

H.L. Bendel, Gerf Das Pista –Eisungverfahren zur Wasser und Abwasserreinigung 72(1951)231).

Korrespondez Abwasser 3/87, p. 238.

IAWQ 1996, 2nd Specialized Conference on "Pretreatment of Industrial Wastewaters". Oct. 16–18, 1996, Athens, Greece, H. Chua, etc. "Decolorization of textile dyeing and finishing wasterwater using electro–coagulation sequence pipe–reactors".

* cited by examiner

WATER TREATMENT PROCESS

This invention relates to a water treatment process, in particular, to a process for the treatment of waste water containing chemically reducible dissolved organic and inorganic pollutants and suspended matter in particulate or colloidal form.

The process of the invention is particularly useful for the treatment of waste water from the wood, wood-based panel, paper-pulp and paper industries, as well as effluent from tanneries, oil wastes such as motor oil or olive oil wastes, dyehouses, fibre, textile and other industries which among other pollutants contain large concentrations of complex organic contaminants of large molecular weight, commonly referred to as macromolecules, along with large concentrations of suspended particles and which are, consequently, difficult to treat fully by the sole use of standard biological processes. A further specific application of the process is the reductive cleavage of nitrogenous and halogenated organic pollutants which may then be removed easily by conventional biological methods. Another application of the process is the removal of inorganic species, such as nitrate, nitrite and phosphate by their chemical entrapment in the form of insoluble compounds which may then be easily removed by precipitation. The net effect of the treatment proposed herein is the decrease in the overall load of pollutants present in a given waste water stream and the chemical conversion, commonly referred to as "softening", of non-readily biodegradable pollutants through a generally complex set of redox reactions so that the stream is subsequently treated more fully, more effectively and at lower cost by conventional anaerobic and aerobic biological treatment processes, such as denitrification and activated sludge systems.

In the various stages of industrial manufacturing processes, such as wood treatment and papermaking, large amounts of water are employed. While significant improvements have been made in the conservation or reuse of water in these processes, it is still necessary to discharge a certain amount of waste water from the system. The process water effluent from processing and manufacturing plants is often a coloured, turbid and odorous liquor consisting of water, dissolved pollutants and particulate matter in suspension. The disposal of large quantities of such process effluents into adjacent streams and bodies of water can result in the pollution of the latter causing among other things the water to attain an objectionable colour and odour.

The composition of industrial wastewaters is typically quite complex often comprising tens or even hundreds of different chemical species in a dissolved, colloidal or particulate form. As a result, the overall quality of a certain waste water stream is conventionally measured by the combined use of lumped composition parameters which denote the overall concentration of entire groups of pollutants with a common characteristic (e.g., carbonaceous compounds, organic nitrogen, suspended solids, colour, odour, halogenated organics, total phosphorus, total phenols etc.) and actual concentrations of individual pollutants (e.g., various heavy metals etc.) which are specifically targeted due to the particularly harmful effects on living species. Among these quality markers, the overall load of oxidizable carbonaceous organic pollutants (the so-called "wastewater strength") comprises most often the major concern with respect to water pollution and is, therefore, regulated quite strictly in most areas. The total concentration of oxidizable carbonaceous organic pollutants in a certain waste water stream is conventionally characterized by its Chemical Oxygen Demand (COD) and Biological Oxygen Demand (BOD).

The Chemical Oxygen Demand (COD) of an aqueous sample is a measure of the oxygen consumption during the chemical oxidation of its organic carbonaceous components by a strong chemical oxidant under standard reaction conditions which ensure the oxidation of at least 95% of the total existing organic carbonaceous contaminants. When precautions are taken to minimize interferences by the oxidation of inorganic species, the COD can be employed to describe relatively accurately the total concentration of organic carbon present in a given aqueous stream.

The Biochemical Oxygen Demand (BOD) of an aqueous sample is a measure of the oxygen consumption during the biological oxidation of its organic carbonaceous components by an aerobic microbial culture and is determined using standardised laboratory procedures whereby the aqueous sample is contacted with an appropriate microbial culture for a predetermined time period. Since biological oxidation is a relatively slow process, the resulting BOD value depends on the contact time employed. A five-day contact period is conventionally employed, hence the nomenclature "5-day BOD or $BOD_5$". When precautions are taken to minimize interferences by the concurrent biological oxidation of certain inorganic species, such as sulphides, ferrous iron, and reduced forms of nitrogen (nitrogenous oxygen demand), the BOD can be employed as a measure of the total concentration of the biologically degradable organic carbon present in the given aqueous stream.

Based on the above definitions, the $COD:BOD_5$ ratio of a given wastewater denotes the ratio of total to biodegradable carbonaceous organic pollutants and may, thus, be used as a measure of its biodegradability. High $COD:BOD_5$ ratios suggest a large concentration of non-readily biodegradable carbonaceous organics which may not be treated by conventional aerobic biological treatment processes, such as activated sludge.

Typical COD values for untreated industrial waste waters range from 400 to 15,000 mg/L while the corresponding $BOD_5$ values from 80 to 4,000 mg/L. On the other hand, typical COD values for untreated municipal sewage range from 400 to 800 mg/L and $BOD_5$ values from 150 to 400 mg/L. It is evident that the $COD:BOD_5$ratio of typical industrial waste waters is far in excess of 2:1 which is the corresponding value for municipal sewage and which, thus, provides a target for the pre-treatment of industrial process water effluents in order to allow an effective further treatment by conventional aerobic biological processes. Treated municipal effluents typically have COD values around 60 mg/L and $BOD_5$ 15 mg/l ($COD/BOD_5$=4:1).

Various physicochemical processes have been proposed for the treatment of process water from industrial manufacturing processes apart from the conventional biological treatments. These non-biological effluent treatment processes, such as filtration methods, advanced oxidation using ultraviolet light, peroxide and ozone, reverse osmosis, precipitation with polyelectrolyte, lime or alum, dissolved-air floatation, carbon adsorption and others, are effective in removing dissolved and particulate contaminants from such streams but are often either partially effective being able to remove only a relatively narrow range of pollutants or prohibitively expensive for use in treating industrial process water effluents, especially, from processes which generate large quantities of waste water, such as pulp and paper mills. The cost of large amounts of chemical reagents, high maintenance costs and expensive facilities along with their often limited scope have rendered these proposed solutions not attractive. A water treatment process has accordingly been sought that has a high level of efficiency, is able to remove a wide spectrum of pollutants and yet requires low investment and operational costs.

EP-A-0 151 120 discloses a method for the removal of heavy metals from an aqueous solution. The method comprises co-precipitating the heavy metal ions with a carrier precipitate that is formed in-situ within the aqueous solution.

In the field of dyestuff manufacture there have been proposals to purify contaminated water through the precipitation of ferric hydroxide to <<entrap contaminants>>. Metallic iron had been used in the 1950s to produce in-situ ferric hydroxide as a coagulant (Dr. H. Jung, Viersen, Ein Beitrag zur Reinigung der Abwasser der Textil und Lederindustrie (Niersverfahren). Ber. Abwassertechn. Vergg 3(1952)95; H. L. Bendel, Gerf Das PISTA -Eisungverfahren zur Wasser und Abwasserreinigung 72(1951)231). This method was later abandoned.

In Korrespondenz Abwasser 3/87, page 238 onwards, there is described a process for the decolourisation of effluents from the textile industry using Fe(II) and calcium hydroxide at pH9.

In "IAWQ 1996, 2nd Specialized Conference on "PRETREATMENT OF INDUSTRIAL WASTEWATERS", Oct. 16–18, 1996, Athens, GREECE, H. Chua, etc. "Decolorization of textile dyeing and finishing wastewater using electro-coagulation sequence pipe-reactors", there is reference to decolouration of dyestuffs in waste waters by means of electrolytic cells with metallic iron electrodes. The electrolysis mechanism uses electric current for decolouration.

U.S. Pat. No. 5,198,118 reports a treatment in which the waste water passes through a reactor containing brass (Cu, Zn) and thereafter an ion exchange column followed by reverse osmosis.

U.S. Pat. No. 4,548,718 discloses the combined use of iron and sulfur to treat metal cyanide complexes and free cyanide.

U.S. Pat. No. 5,575,919 proposes a water treatment for removing metals and TOC at a pH of 5–8.5 using sulfur modified iron catalyst in the presence of peroxide.

U.S. Pat. No. 5,411,664 discloses a biological process to reduce and degrade halogenated organic compounds in the presence of multivalent metals such as Mg, Cu, Ni and Fe.

U.S. Pat. No. 4,194,973 uses Fe(II) produced in-situ by the oxidation of metallic iron at a pH of 5–6.5 to break reductively aryl-azo or aryl-nitro chromophores. The method also precipitates chromium. The method is applied as a pretreatment prior to biological treatment to remove colour but not the organic load from the waste water.

WO 96/20137 discloses a method of dechlorinating a chlorinated organic compound present in an effluent in which the effluent is contacted with a palladizeal iron bimetallic system.

As previously mentioned, these various processes for the treatment of effluents are not sufficiently efficient, most often specifically focused on target pollutants, such as colour, cyanide and metals, and/or too expensive to be employed on a commercial industrial scale.

According to the invention there is provided a process for the treatment for waste water containing dissolved organic and/or inorganic contaminants and/or suspended matter in colloidal and/or particulate form which comprises the steps of (a) contacting the water with iron in the form of solid metal, ferrous ions and/or Fe(II)—containing natural mineral and subsequently (b) separating suspended solids from the aqueous phase characterised in that in step (a) the waste water is contacted with iron in the presence of a promoter metal which promotes the rate of electron transfer from iron to the dissolved contaminants and in step (b) the separated suspended solids include solids formed during step (a) and any suspended matter originally present in the waste water.

Thus there is provided a process for the treatment of contaminated water particularly one containing chemically reducible dissolved organic and inorganic pollutants and suspended matter in particulate or colloidal form, the process comprising contacting the water with metallic iron or ferrous ions ($Fe^{2+}$), or mixtures thereof, in the presence of a promoting metal, such as Cu, Pd, Pt, Au, Ag and Ni which functions as a promoting agent for instance as a catalyst to the redox reductions carried out by the iron or ferrous reagent. The process of the invention is particularly relevant to the treatment of water containing reducible macromolecular materials. The promoting metal may be present in the form of a pure solid metal, such as shavings, scrap and pellets, or an insoluble compound of the metal, such as oxide and sulfide, to minimize its complexation with pollutants present in the waste water and/or dissolution into the aqueous phase and, thus, its loss from the reactor. The promoting metals may also be deposited as a thin coating layer on the surface of metallic iron by pretreating the latter with an aqueous solution containing appropriate concentrations of metal cations, such as $Cu^{2+}$ and $Ag^{2+}$.

The iron may be used in the form of elemental iron, iron compounds or iron containing ores or natural minerals.

This invention provides an efficient and practical process for the treatment of waste waters containing dissolved organic and inorganic pollutants amenable to chemical reduction and suspended matter in particulate or colloidal form. Examples of such waste waters include process water effluents from tanneries, dyehouses, fibre, textile, wood and paper industries and oil-contaminated (e.g. motor-oil, olive-oil etc.) water streams. Because of the often complex chemical structure, large molecular weight and oxidized nature of the dissolved contaminants present in such effluents these streams are usually not easily treated by is conventional biological wastewater treatment methods. On the other hand, the removal of the often high load of particulate matter from such effluents by filtration or sedimentation typically requires the use of costly coagulation aids to facilitate the aggregation of small particles into large agglomerates which can then be separated more effectively from the aqueous phase.

The treatment of these effluents in accordance with the present invention results in the chemical reduction of complex and highly oxidized dissolved pollutants and the simultaneous coagulation of suspended colloidal and particulate pollutants which are subsequently removed easily by settling or filtration without the use of additional coagulation aids. The overall result of the treatment is the production of an aqueous stream with a substantially lower total carbonaceous and nitrogenous load, a substantially lower concentration of suspended solids and almost always a typically lower COD:BOD ratio suggesting a higher biodegradability of the residual pollutant load.

Occasionally, a process water stream treated by the process described herein is of adequate quality to be recycled and re-used in the manufacturing process without further treatment. This is of particular significance to the paper industry which utilizes large quantities of water and where process water recycling is often accomplished by employing energy-intensive treatment methods, such as dissolved air floatation (DAF). However, when the final disposal of the waste water stream into a natural body of water is sought, further treatment by conventional biological treatment methods is typically required. In such cases, the application of a process in accordance to this invention to a waste water stream prior to or in parallel to biological treatment makes the latter more feasible, more efficient, more economical in terms of both capital investment and operating cost and, also, the finally discharged water more compatible with environmental demands.

Without limitation to a particular theory of operation of the invention, it is believed that the process involves a redox system in which metallic iron is a reducing agent being itself oxidised to ferrous ($Fe^{2+}$) and thereafter to ferric ($Fe^{3+}$) ions while certain electrophilic ("electron loving") sites on pollutant molecules function as electron acceptors thus being reduced and providing a mechanism for a partial cleavage of the pollutants by the simultaneous addition of hydrogen ions ($H^+$) and electrons. It is also believed that the presence of promoting metals in contact with iron or ferrous ions reduces the activation energy required for electron transfer from the latter to a reducible pollutant, thus, accelerating the reaction rate.

The overall reaction scheme may be figuratively depicted as follows:

$$Fe_{(s)} - 2e^{31} \rightarrow Fe^{2+} \quad (1)$$

$$Fe^{2+} - e^- \rightarrow Fe^{3+} \quad (2)$$

$$R_1R_2 + 2e^- + 2H^+ \rightarrow R_1H + R_2H \quad (3)$$

where $R_1R_2$ is an organic molecule susceptible to reductive cleavage between the two groups $R_1$ and $R_2$.

The ferrous ions ($Fe^{2-}$) produced in excess as an intermediate iron oxidation product can promote further reduction of dissolved materials and, in fact, ferrous salts, such as ferrous sulphate, in the presence of a promoter metal can be used as a starting material for chemical reduction of pollutants in its own right.

In the method according to this invention the metallic iron is primarily utilised for the reductive cleavage of reducible organic pollutants in the waste water. The production of ferric ions ($Fe^{3+}$) is merely a secondary effect of the reducing action of the metallic iron but the ferric ions so produced conveniently find employment in the removal of suspended colloidal and particulate matter present in the waste water. Examples of such suspended particles include wood and paper particles, when the effluent is from the wood treating and paper manufacturing industries, or particulate material from other industries such as leather, dyestuff, fibre and textiles. Particularly significant is the reduction of macromolecular contaminants. The removal of such suspended matter is accomplished by a combination of particle coagulation through charge neutralisation and/or entrapment by insoluble ferrous and ferric hydroxides as well as insoluble hydroxides of other metals present in the waste water which form readily at a pH of 7 to 8.5 and precipitate out of the solution. As a result, undesirable metal ions, particularly undesirable heavy metal ions, can also be removed from the system as a secondary effect.

The promoter metals which can be used in the invention are those usually identified by the term noble metal including silver, nickel, gold, platinum and palladium but an important metal is copper which although belonging to the same group of the Periodic Table is not usually regarded as "noble". Other "noble metals" for example, ruthenium or rhodium may be employable but are probably too expensive for practical use. Other metals may also promote the reaction. Whether or not another metal is suitable can be tested by first verifying that it does not adversely affect the reaction usually the metal must not be significantly reactive. Addition of a possible metal to iron/iron ions will then indicate whether a superior result is obtained as compared to iron alone.

The activating or promoting metal can be included either in the form of individual particles of the elemental metal or as will be discussed by plating on to the surface or at least part of the surface of the iron or can be included as a compound of the metal. Compounds of the activating metal usable for the purposes of promoting the activity of iron can be many of those commonly available. However, the compounds are most preferably insoluble compounds particularly oxides and sulfides. One skilled in the art will be well aware of the likelihood that a particular compound form of a metal will be likely to be capable of activating the iron but if there is any doubt this can be readily verified by simple testing.

Generally only one promoting metal will be employed since two or more promoting metals in contact with each other as well as iron could result in dissolution of the metals except for the one with lowest polarisation potential. However, different promoting metals may be usable in different sections of the reactor system or even the same reactor vessel.

The proportion of activating metal to iron can depend on whether the promoting metal is in elemental form or compound form. Usually this will be measured by the ratio of the content of metal measured as elemental form to elemental iron as such in the system, i.e. in the context of metal compound and ferrous compound the ratio of metal ion to ferrous ion.

The amount of promoting metal measured as elemental metal by weight of elemental iron can range from very small (catalytic amounts) to amounts in excess of 50% by weight of iron even to 1:1. Where the components are in solid (e.g., elemental form) a relevant factor may be the degree of contact i.e. area of surface of iron in contact with promoter metal. Whatever the upper limit clearly there must be present a significant amount of iron in the final system.

As stated, the precise function of the promoter metal is not completely clear. The effect may be partly in enhancing the reducing effect of the iron and partially the enhancement of the elemental iron→ferrous→ferric reaction. The important point is that the presence of the promoter enhances the efficiency of iron/ferrous ions in removing contaminants.

The treatment according to this invention involves a sequence of two stages, that is a reaction phase followed by the separation of the coagulated solid particles, which may be applied in a spatial or time sequence (continuous or batchwise treatment, respectively). Solid particle removal is accomplished most often by settling. Nevertheless, alternative embodiments of the invention, may also employ other appropriate solid separation technologies, such as filtration or floatation.

As will be described the process of the invention can be applied to a wide range of water streams originating from different industrial processes and also waste water from sewage systems etc. For example, the process of the invention can be used to treat municipal sewage, effluents from wood or wood-based panel industries, paper and pulp industries, dyestuff treatments, fibre or textile industries, tanneries, the production of natural or synthetic lubricants or petroleum based products, or edible oil products. The process of the invention may not be equally successful in the treatment of all contaminated waters depending on the nature of the contaminant and its physical form. Also the proportion of promoting metal to iron may affect the particular success of one system. In general however, the system of the invention will be more successful in treating a waste or contaminated water than, for example, the use of the ferrous compounds or metallic iron by itself. Clearly, for any particular waste water it may be necessary to have some simple testing to determine the most successful conditions for operation to achieve the best available decontamination. To the extent that a waste water may contain inert suspended matter in colloidal or particulate form this may also be removed by operation of the process together with the particular material resulting from the chemical reduction effected by the process of the invention.

Because of the chemical nature of the treatment in this invention, the set of operating conditions employed, such as the pH during the reaction and the solid separation stages, the operating temperature and the duration of the reaction and solid separation stages, may have a significant effect on the overall efficiency of the treatment. In fact, the operating parameters employed would have to be tailored to the particular effluent being treated.

The pH employed during the reaction stage may range from highly acidic to highly alkaline, e.g. from 4 to 11, depending on the nature of the waste water stream under treatment. A pH of 9 for the actual reduction may be particularly useful. Nevertheless, during the solid separation stage, a pH between 7 and 8.5 where iron is known to exhibit the lowest solubility in the aqueous phase should preferably be applied during the solid separation phase. Contact times for reaction and solid removal depend on the precise nature and concentration of dissolved and suspended pollutants in the incoming waste water. Contact times between 1 and 180 minutes during the reaction stage have been employed successfully, the average contact time being between 4 and 90 minutes. Retention times employed for subsequent solid separation may range between 5 and 180 minutes depending on the actual technology employed. In the specific embodiment of this invention where sedimentation is employed as the solid separation technology, typical settling times employed are between 20 and 60 minutes. The operating temperature employed affects the kinetics of the various chemical reactions, the solubility of species, the speciation of iron and other metals in solution and the kinetics of solid particle coagulation and separation and is largely determined by the temperature of the incoming waste water stream. Operating temperatures between 2 and 80° C. have been employed successfully.

While it is desirable to exclude oxygen from the reactor as far as possible to ensure that the metallic iron and ferrous ions are fully utilized for the reduction of the reducible dissolved pollutants, it is not necessary to undertake special measures to totally exclude oxygen; any such measures would greatly increase the cost of the treatment process.

Even though for certain applications, such as the treatment of process water from paper manufacturing prior to its recycling, the process of this invention may be sufficient as a stand-alone treatment, in most applications and, certainly those where the waste water stream is to be disposed of into a natural stream or body of water, treatment by conventional aerobic and anaerobic biological methods is most likely required subsequently (either on-site or off-site in a nearby municipal sewage treatment facility) or in parallel to the process of this invention.

In the typical embodiment of the invention, the process of this invention is applied for the pre-treatment of a waste water stream prior to biological treatment. The exact implementation of the treatment in terms of mode of operation (continuous-flow or batch) and system configuration depends on the nature of the incoming wastewater and the pre-treatment objectives. In general, there is a multitude of system configurations that may be applied.

The invention will now be illustrated with reference to the accompanying drawings in which FIG. 1 presents a schematic illustration of a continuous-flow plant in accordance with a preferred embodiment of the invention for the pre-treatment of waste water prior to biological treatment.

Figure 2:
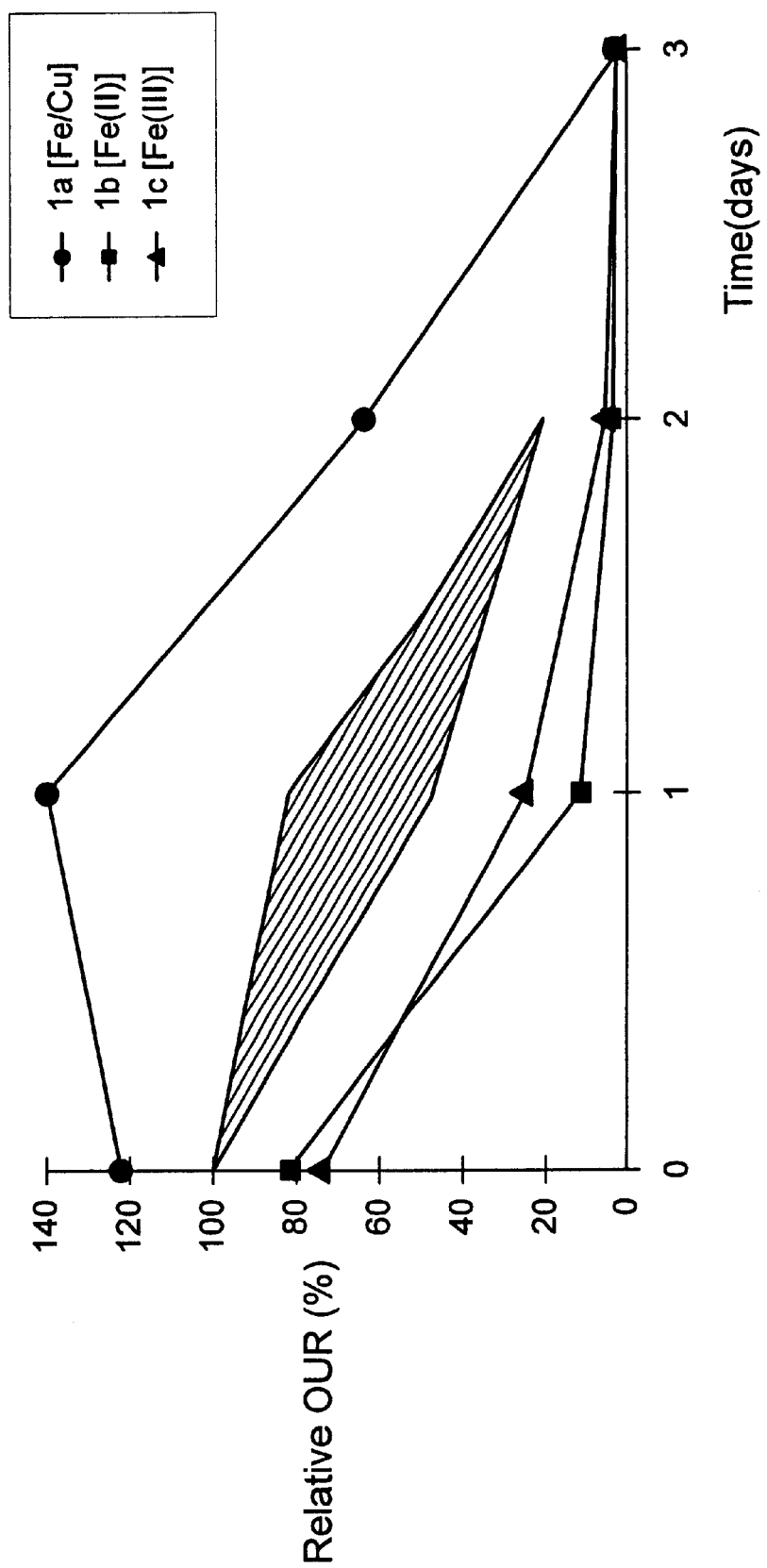

FIG. 2 presents a diagrammatic illustration of the effect of a treatment according to the invention on OUR (comparative Example 5).

Waste water to be treated in accordance with the present invention may originate from different sources in an industrial manufacturing process. The combination of partial waste water streams is generally carried out in equalisation tanks where circulation of the waters ensures thorough mixing. The pH of the waste water after the equalisation step is generally between 8 and 10.

In the particular treatment embodiment depicted in FIG. 1, water A from an equalisation tank (not shown) is directed to a sequence of four tanks 10, 11, 12, 13 consisting of two reactors 10 and 12 each followed by a settling tank 11 and 13 for the separation of solids coagulated in the preceding reactor by sedimentation. To simplify the discussion that follows, the first reactor-clarifier sequence 10, 11 will be referred to as the primary treatment stage or Stage 1, while the second one 12, 13 as the main treatment stage or Stage 2. As is shown in FIG. 1, the main reactor 12 in Stage 2 involves a metallic iron fixed-bed tower.

The feed is first directed to a primary reactor 10 (Stage 1) where it is contacted with ferric and ferrous ions recycled from the bottom of the final clarifier 13 in Stage 2 and promoter (usually in elemental metallic form) in a solid form which is preloaded in the tank. The incorporation in the treatment sequence of a primary reaction stage where fresh waste water is contacted in the presence of promoter metal with ferrous and ferric ions recycled from the main reactor 12 (Stage 2) allows for the initialization of the reductive reactions leading to the chemical softening of reducible incoming pollutants, the coagulation and removal of colloidal and particulate suspended matter present in the fresh waste water and the removal of certain inorganic pollutants, such as hydrogen sulfide and phosphate, that may react with ferrous or ferric ions forming insoluble compounds and are removed by sedimentation in clarifier 11 in Stage 1. In this manner, the given system configuration avoids the unnecessary loss of ferrous and ferric ions produced in the main reactor 12 (Stage 2) and, thus, makes full use of the reducing and coagulating capacity of the metallic iron supplied in Stage 2 which is then used predominantly for the reductive cleavage of reducible organic contaminants entering the main reactor instead of being partially lost in side reactions and coagulation of particulate matter which may often be of secondary importance. The outlet from the primary reaction tank 10 is directed to the first clarifier 11 where the largest fraction of coagulated solids settle out and are removed from the system in the form of sludge while the clear supernatant liquid is decanted into the main reactor 12 (Stage 2).

The main contact of pollutants with the iron/promoter mixture takes place in the fixed-bed tower in the main reactor 12 (Stage 2). The fixed bed contains metallic iron particles in the form of shavings, scrap, pills or other types of pellet. The use of such iron waste material advantageously minimises the costs of the water treatment process. The iron particles should, however, be relatively pure. Appropriate quantities of promoter are also in contact with the metallic iron in the bed in a manner that they are distributed relatively evenly throughout the bed.

Liquor from the main reactor is pumped continuously through the iron bed to achieve contact of pollutants with the iron/catalyst mixture. The bed is designed in a manner that ensures good contact and a sufficiently large interface between the iron bed and the aqueous phase to accomplish high rates of electron flow from the iron to the reducible pollutants.

The water leaving the tower contains, among other reaction products, ferrous and ferric ions as well as small quantities of unreacted metallic iron and promoter solid particles that are detached from the bed by means of friction and are washed out of the tower. These partially-reacted or totally unreacted iron species may in turn promote pollutant reduction reactions in the bulk liquid. As a result of its reactive dissolution in the tower, the metallic iron needs to be replenished at regular time intervals e.g. from seed tanks 14 and 15. The outlet from the main reactor 12 is directed to the final clarifier 13 where coagulated suspended solids, insoluble hydroxides settle out and are recycled into the primary reactor 11 (Stage 1) while the clear supernatant stream 13 is directed to the subsequent biological treatment.

Despite the distinct operating advantages of the treatment configuration shown schematically in FIG. 1, this is merely one possible implementation of the process of this invention. Stage 2 in FIG. 1, that is the main reactor followed by settling, may also be employed to simplify the engineering of the system. Further specific embodiments of the invention may involve the use of a single or multiple iron/promoter fixed-bed towers recycling liquor from an equalization tank or the use of a cascade of such towers in series followed by a single clarifier. Other process configurations may involve the use of alternative particle removal technologies, such as filtration, floatation etc. and combinations thereof. Finally, the process of the invention may also be applied in a cyclic batchwise manner whereby waste water is fed periodically into the reactor tank and is subjected to a chemical treatment achieved by recirculation of the liquor through the tower for a certain time period. At the end of the reaction stage, liquor pumping through the tower is stopped and solid settling is allowed to take place in the same tank for a certain time period after which sludge is removed from the bottom of the tank and clear supernatant from the top, thus completing a full cycle.

In a further specific embodiment of the invention, the process of the invention may be applied in parallel to conventional biological treatment methods in the same unit. As with the separate pre-treatment application prior to biological treatment which was discussed earlier, there is a multitude of possible system configurations depending on the nature of the incoming wastewater and the treatment objectives.

In a specific embodiment of this invention the fixed bed may contain, in addition to iron and promoter, appropriate packing material of sufficient surface area which may provide a substrate for the attachment and growth of microbial biofilms. System operation under anaerobic conditions will promote the growth of anaerobic microbial cultures capable of reducing complex and oxidized pollutants, thus, taking advantage of simultaneous chemical and biological reductive mechanisms functioning in the same unit. The operation of such a tower under aerobic conditions will promote the growth of aerobic microbial cultures and, thus, allow for a simultaneous reductive cleavage of pollutants by the iron/promoter system and biological oxidation of the resulting more-readily biodegradable pollutants in the same unit. In a further specific embodiment of this invention where activated carbon or other porous adsorbents are employed as a microbial support medium, complex pollutants, such as lignin and cellulose, will tend to be adsorbed onto the adsorbent surface and will thus be retained in the tower for extended time periods resulting in their prolonged contact with the iron/promoter mixture and the microbial culture and allowing for a more complete degradation, possibly, to end oxidation products, such as $CO_2$ and water.

A further specific embodiment of this invention for the simultaneous chemical and biological degradation of pollutants present in a waste water stream is by employment of an iron/promoter fixed-bed tower to treat by recycle the liquor from a certain stage in a conventional biological treatment sequence, such as the denitrification or the activated sludge tanks.

The invention will now be illustrated in a series of examples. Based on the points illustrated in them, these examples may be grouped in four distinct classes:

I. Comparison with results from relevant prior art

II. Treatment feasibility for different types of industrial waste waters

III. Process feasibility under a range of operating conditions

V. Process implementation to enhance downstream or parallel biological treatment.

A summary of the examples discussed below is shown in the following Table:

| Example # | Discusses | Industry | Comments |
|---|---|---|---|
| I Comparison with results from prior art | | | |
| 1 | residual COD from treatment with Fe(II) vs. Fe(II)/Cu | Paper mill | Higher COD removal efficiency in the presence of Cu compared to standard |
| 2 | residual COD from treatment with Fe vs. Fe/Ag vs. Fe/Cu vs. Fe/Ni vs. Fe/Au | recycled Newsprint mill | Higher COD removal efficiency in the presence of noble metals compared to standard |
| 3 | residual COD and biodegradability from treatment with Fe vs. Fe(II) vs. Fe(III) vs. Fe/Cu | Plywood, Particle board manufacturing | Higher COD removal efficiency and residual biodegradability in the presence of noble metals compared to standard treatments |
| 4 | Residual COD, BOD and COD:BOD ratio from treatment with Fe(II) vs. Fe/Cu | Tissue paper mill | Substantially higher COD but lower BOD removal efficiency in presence of Cu, resulting in a substantially lower COD:BOD ratio in the treated sample compared to standard Fe(II) treatment |

-continued

| Example # | Discusses | Industry | Comments |
|---|---|---|---|
| 5 | Oxygen uptake rate in sample treated with Fe(II)/Fe(III) vs. Fe/Cu | Plywood, Particle board manufacturing | Dramatic improvement in OUR of sample treated in presence of Fe/Cu suggesting formation of more-easily biodegraded pollutants. |
| II. Treatment feasibility for different types of industrial waste water | | | |
| 6 | 6.1 | recycled Newsprint | Show effect of our treatment on a multitude of different |
|  | 6.2 | wood | parameters (COD, BOD, |
|  | 6.3 | petrochemical products | COD:BOD, SS, color, odor, $NH_4$, $NO_3$, $NO_2$, phenols, |
|  | 6.4 | dyehouse | AOX etc.). Illustrates the |
|  | 6.5 | food processing | simultaneous removal of a wide range of pollutants of |
|  | 6.6 | sewage | different nature in all samples |
| III. Process operation under a range of operating conditions | | | |
| 7 | residual COD, BOD, COD:BOD and color from treatment with Fe(II)/Cu at pH 5.5, 7.0 and 10.5 | recycled Newsprint mill (drum-filtered effluent) | Substantial COD, BOD and color removal and simultaneous COD:BOD improvement in all cases |
| 8 | residual COD from treatment with Fe(II)/Cu at contact times of 5 min vs. 20 min vs. 1.5 h | Medium-density fibreboard manufacturing | COD removal efficiency increases with contact time. Reaction times as low as 5 min yield more than 50% COD removal |
| 9 | residual COD from treatment with Fe(II)/Cu with Fe:Cu of 1.3:1 vs. 2:1 vs. 4:1 w/w | recycled Newsprint mill | No effect of Fe:Cu ratio on COD removal efficiency. |
| IV. Process implementation to enhance downstream or parallel biological treatment | | | |
| 10 | Industrial-scale application: Effect of retrofitting a process of the invention to provide a pre-treatment of an industrial process water effluent prior to biological treatment. | food processing plant | Application of the pretreatment by a process of the invention resulted in 60% COD removal prior to biological treatment allowing for doubling the capacity of the latter from 10 to 20 $m^3/d$ without deterioration of the effluent quality. |
| 11 | pilot-scale biological treatment of an process water effluent with vs. without parallel treatment by a process of the invention | Pre-clarified effluent from Plywood, Particle board manufacturing | final effluent COD improves by 50%, overwhelmingly lower $NH_4$—N and phenol levels accomplished by the parallel chemical and biological treatment. |
| 12 | Pilot-scale application: Final effluent quality produced by employing a pre-treatment by a process of the invention prior to full biological treatment | recycled Newsprint mill raw effluent | Very high final effluent quality allowing for water recycling into manufacturing process |

I. Comparison with results from prior art

This class of examples illustrates that the incorporation of a promoter metal catalyst in a form of solid metal or an insoluble compound containing it into standard widely used water purification technologies whereby ferrous ($Fe^{2+}$) salts are used for reduction/coagulation and ferric ($Fe^{3+}$) salts are used solely for coagulation improves the process efficiency both in terms of COD removal and biodegradability of the treated waste water. The results of the treatment are also compared to those obtained by the sole use of metallic iron, which, however, in the art is not used as a standard generic water purification method but only for the reductive degradation of specific pollutants so that they may subsequently be removed by precipitation or biological oxidation.

EXAMPLE 1

The process water effluent from a paper mill after standard primary treatment by drum filtration has a COD of 1,500 mg/L. A sample of this waste water stream was treated in accordance with the present invention as described below: 200-mL samples of this wastewater were placed in three identical vessels and different quantities of a ferrous ($Fe^{2+}$) salt and metallic copper shavings were added to each vessel (see result Table below). The vessels were capped and shaken for 5 min. Subsequently, the pH of the solution in each vessel was adjusted to 8.5 and the treated samples were allowed to stand for 20 minutes, whereupon sedimentation occurred. Analysis of the supernatant layer of each treated sample yielded the following results:

| Vessel No. | FeSO$_4$ used (mg/L) | Cu weight used (g) | Final COD (mg/L) | Percent (%) COD removal |
|---|---|---|---|---|
| 1 | 90 | 0 | 1,300 | 14 |
| 2 | 90 | 100 | 850 | 44 |
| 3 | >0 | 100 | 1,330 | 12 |

It is evident from Example 1 that a treatment in accordance to this invention whereby a mixture of ferrous ions and metallic copper is used (Vessel No.2) results in a substantially higher removal of COD from the original wastewater than when ferrous ions or metallic copper are used alone (Vessels No.1 and 3).

EXAMPLE 2

The process water effluent from a newsprint mill utilizing 100% recycled paper as a starting material has upon drum filtration a grey turbid color, a strong odor and a COD of 1,650 mg/L. A sample of this waste water stream was treated in accordance with the present invention and with metallic iron alone as described below:

The pH of this wastewater was first adjusted to 5.5. Subsequently, 200-mL samples were placed in four identical closed vessels each containing 200 g of iron shavings along with a different promoter metal or metal sulfide selected from the group Cu, CuS, Ag, and Ni. An additional 200-mL sample was placed in a fifth identical vessel containing only 200 g of iron shavings. The five vessels were capped and shaken for 20 min after which the pH of the solution in each of them was adjusted to 8.5 and the treated samples were allowed to stand for minutes, whereupon sedimentation occurred. At the end of the settling period, the supernatant layer in all samples was odourless, transparent and almost colourless. The following COD removal efficiencies were accomplished in each vessel:

| Vessel No. | Promoter used | Percent (%) COD removal |
|---|---|---|
| 1 | Cu | 52 |
| 2 | CuS | 52 |
| 3 | Ag | 46 |
| 4 | Ni | 31 |
| 5 | no promoter | 27 |

As is apparent, the addition in the reactor of a promoter metal in accordance to this invention (Vessels No. 1–4) results always in a higher COD removal efficiency compared to that obtained by the sole use of metallic iron (Vessel No.5). The actual treatment enhancement produced by the addition of the promoter ranges from marginal for Ni (Vessel No. 4) to substantial for Cu and CuS (Vessel No. 1–2). Thus, the nature of the promoter employed is also important. It should also be noted that the use of a Cu as a pure metal (Vessel No. 1) and as a sulfide (Vessel No. 2) yielded identical results. However, CuS is more insoluble in water and more resistant to complexation and solubilization effects by pollutants present in the wastewater.

EXAMPLE 3

The combined effluent from a plant manufacturing wood-based panels (plywood, particle board, round wood etc.) is a highly turbid dark red in color solution with a COD of 14,800 mg/L. Samples of this effluent were treated with a process in accordance with this invention as well as with standard treatment methods based on prior art.

EXAMPLE 3.1

The pH of the waste water was first adjusted to 9.5 and a 200-mL samples was then placed in a vessel containing 200 g of iron shavings along with 100 g of Cu shavings. The vessel was capped and shaken for 5 min after which the pH of the solution was adjusted to 8.5 and the treated sample was allowed to stand for 20 minutes to allow for the sedimentation of solid particles. At the end of the settling period, the supernatant solution had a COD of 3,100 mg/L for a 79% removal compared to that of the raw sample.

COMPARATIVE EXAMPLE 3.2

The pH of the wastewater was adjusted to 9.5 and 200-mL samples were placed in three vessels identical to those in Example 3.1 but without any metallic iron or copper. 90 mg/L of FeCl$_3$ were added in the first vessel, 90 mg/L of FeSO$_4$ in the second and 100 g of metallic iron shavings in the third. The vessels were closed and shaken for 5 min after which the pH of the solution was adjusted to 8.5 and the solids in the treated samples were allowed to settle for 20 minutes. At the end of the settling period, the supernatant solution in the three vessels had the following COD:

| Vessel No. | Reagent dose | Final COD (mg/L) | Percent (%) COD removal |
|---|---|---|---|
| 1 | 90 mg/L FeCl$_3$ | 6,000 | 59 |
| 2 | 90 mg/L FeSO$_4$ | 6,000 | 59 |
| 3 | 100 mg metallic iron | 6,680 | 54 |

By comparing the results obtained in Examples 3.1 and 3.2, it becomes apparent that, a process in accordance with this invention produces a significantly higher COD removal from the original wastewater than when iron is used in any of its standard forms for reduction and/or coagulation in the absence of promoter.

In addition, as becomes evident from Oxygen Uptake Rates (OUR) measured for each sample separately, the sample that was treated in the presence of a promoter exhibited a much more intense biological activity than those treated in the absence of promoter, indicating a higher concentration of readily-biodegradable pollutants in the former (see Example 5). This is of great importance for the subsequent treatment of the waste water by standard biological methods before its final disposal since sample pre-treatment in accordance to this invention will not only require smaller biological treatment plants but also will allow the easier assimilation of the residual pollutants by the biomass and, thus, a higher quality of the finally disposed stream.

EXAMPLE 4

A mixed sample of wastes from a paper mill with the following characteristics:
COD=1,500 mg/L
BOD=475 mg/L
COD:BOD=3.1:1
was treated in accordance with the present invention:

EXAMPLE 4.1

The pH of this sample was adjusted to 10.5. The sample entered a 7 m$^3$ tank, in which an 160-L fixed-bed tower containing 50 kg of iron shavings mixed with 15 kg of copper shavings and the waste water was recycled through the tower or a contact time of about 25 minutes. The sample was then aerated for (contact time) of about 25 minutes, until the colour of the solution became brown from $Fe^{3+}$ formation. The solution was allowed to stand, whereupon sedimentation occurred. The upper phase was colourless transparent and odourless, and possessed the following characteristics:

COD=470 mg/L (69% removal)
BOD=160 mg/L (67% removal)
COD:BOD=3:1

COMPARATIVE EXAMPLE 4.2

A quantity of 250 mL of the brown, odorous raw waste water sample was adjusted to a pH of 10.5. To this sample was then added 90 mg/L of $FeSO_4$. The mixture was stirred for 25 minutes and then aerated for further 25 minutes with air. The mixture was then allowed to stand whereupon sedimentation occurred, and thereafter the upper phase was collected. The resultant upper phase characteristics were as follows:

COD=1,133 mg/L (25% removal)
BOD=130 mg/L (73% removal)
COD:BOD=8.7:1

This upper phase also had a yellow colour.

It becomes obvious from this example that, when compared against the application of Fe(II) which is the most widely used form of iron in water purification and is capable of both reduction and coagulation, the method according to the invention, produced a higher COD removal but lower BOD removal efficiencies. This indicates that it has either removed less biodegradable organics than the former or has chemically transformed a larger fraction of the non-biodegradable COD present in the original waste water into biodegradable organics. In any case, since both methods are used as a pretreatment prior to biological treatment, the sample treated in accordance with this invention will not only have a lower overall load of carbonaceous organic pollutants (COD) but will also contain a higher fraction of biodegradable organics (lower COD:BOD ratio) before proceeding to the biological treatment than the one treated by the standard method using Fe(II) salts. This in turn translates into smaller biological treatment plants and more effective operation of the biomass in them.

EXAMPLE 5

A mixed sample of wastes from a wood-based panel manufacturing plant is dark brown in colour, odorous and has the following characteristics COD=14,480 mg/L
BOD=4,530 mg/L was treated in accordance with the present invention:

EXAMPLE 5.1

The pH of this sample was adjusted to 10.5. The sample was placed into a closed vessel, containing 200 g of iron shavings mixed with 100 g of copper shavings and shaken for 25 minutes. The sample was then aerated for 25 minutes and allowed to stand, whereupon sedimentation occurred. This upper phase was colourless, transparent and odourless.

COMPARATIVE EXAMPLE 5.2

Quantities of 250 mL of the dark brown, odorous sample were adjusted to a pH of 10.5 and were then placed in two empty vessels identical to that of Example 5.1 containing no iron or copper. A quantity of 45 mg/L of $FeSO_4$ was added into the first vessel and 45 mg/L of $FeCl_3$ into the second. The solution in the two vessels was stirred for 25 minutes, then mixed for further 25 minutes with air and, finally, allowed to stand for 20 minutes, whereupon sedimentation occurred, and the supernatant layer in the two vessels was collected.

The same quantity of the clarified samples treated in Examples 5.1 (that is, by a Fe/Cu mixture) and 5.2 (that is, by either $Fe^{2+}$ or $Fe^{3+}$ alone) were added into three vessels (a different pre-treated sample in each vessel) each containing 200 mL of a pre-clarified municipal waste water from a local municipal sewage treatment plant with a biologically active culture of microrganisms. A fourth vessel containing only 200 mL of the pre-clarified municipal sewage was used as a standard for the experiment. No additional food was added to the four vessels, so that the biomass in each sample could grow by consuming only pollutants present in the municipal sewage as well as in the three pre-treated industrial waste samples added to it. The experiment was performed over a period of 4 days during which the biomass respiration rate in each reactor was determined every day by employing standard techniques which measure the Oxygen Uptake Rate (OUR) by the microorganisms growing in each sample. The method consists in oxygenating the liquid phase in each reactor to a predetermined level of dissolved oxygen (DO) (approx. 6 mg/L) and then monitoring the DO consumption as a consequence of the biological activity in the aqueous phase with time. The OUR (Oxygen Uptake Rate) is then computed as follows:

$$\text{OUR [mg DO/(mgM/O} * \text{h)]} = \frac{\text{OXYGEN Consumption [mg DO/L]}}{\text{Time [h]} \times \text{Micro-organism (M/O) concentration [mg/L]}}$$

The results of these measurements are illustrated in FIG. 2 which illustrates the effect of the pre-treatment of the OUR.

Curve 1a corresponds to the OUR parameter obtained for the waste water treated in accordance with the present invention (Example 5.1) while Curves 1b and 1c show the OUR parameter achieved for the sample treated by conventional Fe(II), Fe(III) treatment, respectively, for reduction/coagulation (Comparative Example 5.2). Finally, the shaded area corresponds to the OUR parameter measured for the activated municipal sludge alone in the blank.

It is easily seen that, the OUR obtained after treatment in accordance with the present invention, including reductive cleavage with metallic iron in the presence of a catalyst and precipitation with Fe(III) produced in-situ is higher than for the waste water treated only with Fe(II) or Fe(III). Clearly, waste water treatment according to the process of the invention results in a higher activation of the microorganisms. This is a reflection of nourishment being more readily available to the micro-organisms as a result of the preceding chemical degradation (reductive cleavage) of the macromolecular waste material.

II. Treatment Feasilbility for Different Types of Waste Water

This group of examples demonstrates that a process in accordance to the present invention may be employed as an across-the-board treatment technology, that is for the removal of a wide spectrum of dissolved and suspended organic and inorganic pollutants (some of which, such as halogenated organics, dyes etc., are too complex in structure or too oxidized to be readily degraded by standard aerobic biological treatment technologies) from a range of industrial waste waters of different origin.

EXAMPLE 6

Quantities of 200-mL of waste waters from various sources were added into identical vessels each containing 200 g of iron shavings mixed with 100 g of copper shavings. The vessels were capped and shaken for 5 min after which the pH of the solution in each of them was adjusted to 8 and the treated samples were allowed to stand for 20 minutes, whereupon sedimentation occurred. At the end of the settling period, the supernatant layer of the three samples was analyzed yielding the results discussed in the following examples.

EXAMPLE 6.1

Raw process water effluent from a newsprint mill using 100% recycled paper as a starting material.

| Parameter | Before Treatment | After Treatment | Percent (%) Removal |
| --- | --- | --- | --- |
| COD (mg/L) | 2,892 | 485 | 84 |
| $BOD_5$ (mg/L) | 242 | 159 | 34 |
| COD:BOD ratio | 12:1 | 3:1 | |
| Suspended Solids (mg/L) | 1,760 | 40 | 98 |
| Odor | strong | odorless | |
| Color/Turbidity: | Grey/Turbid | Light Yellow/Clear | |
| Abs at 440 nm (yellow) | 2.8 | 1.11 | 61 |
| Abs at 500 nm (red) | 2.4 | 0.69 | 71 |
| Abs at 600 nm (blue) | 2.4 | 0.58 | 76 |
| $NH_4$—N (mg/L) | 0.2 | 0 | 100 |
| $NO_3$—N (mg/L) | 8.25 | 1.45 | 83 |
| $NO_2$—N (mg/L) | 2.15 | 0.25 | 88 |
| $PO_4$—P (mg/L) | 6.6 | 1.25 | 81 |
| Phenols (mg/L) | 21.5 | 3 | 86 |

EXAMPLE 6.2

Raw process water effluent from wood-product manufacturing.

| Parameter | Before Treatment | After Treatment | Percent (%) Removal |
| --- | --- | --- | --- |
| COD (mg/L) | 2,868 | 960 | 67 |
| Color/Turbidity: | Dark Green/Turbid | Light brown/Clear | |
| AOX (µg/L) | 3 | 1.3 | 57 |
| $PO_4$—P (mg/L) | 18 | 3 | 83 |
| Phenols (mg/L) | 12 | 6.4 | 47 |

EXAMPLE 6.3

Washings from a gasoline station contaminated with synthetic and petroleum-based motor oil.

| Parameter | Before Treatment | After Treatment | Percent (%) Removal |
| --- | --- | --- | --- |
| COD (mg/L) | 1,040 | 240 | 77 |
| BOD (mg/L) | 6 | 4 | 33 |

| Parameter | Before Treatment | After Treatment | Percent (%) Removal |
| --- | --- | --- | --- |
| COD:BOD ratio | 173:1 | 60:1 | |
| Suspended Solids (mg/L) | 180 | 120 | 33 |
| $PO_4$—P (mg/L) | 8.1 | 5.0 | 38 |
| Phenols (mg/L) | 3.3 | 2.9 | 13 |

EXAMPLE 6.4

Effluent from a wool dyehouse.

| Parameter | Before Treatment | After Treatment | Percent (%) Removal |
| --- | --- | --- | --- |
| Color/Turbidity: | Dark Pink/Clear | Colorless/Clear | |
| Abs at 440 nm (yellow) | 0.33 | 0.12 | 63 |
| Abs at 500 nm (red) | 0.32 | 0.10 | 70 |
| Abs at 600 nm (blue) | 0.25 | 0.05 | 79 |

EXAMPLE 6.5

Raw process effluent from a dairy-product processing plant.

| Parameter | Percent (%) Removal |
| --- | --- |
| COD (mg/L) | 86 |
| $BOD_5$ (mg/L) | 35 |
| Suspended Solids (mg/L) | 88 |
| $NO_3$—N (mg/L) | 100 |
| $NO_2$—N (mg/L) | 75 |
| $PO_4$—P (mg/L) | 91 |
| Phenols (mg/L) | 91 |

For comparison purposes, it is important to note that the application on the particular raw process effluent of Fe(II) which is the most commonly used form of iron for both reductive and coagulation purposes has had absolutely no effect in terms of fat and protein precipitation from the aqueous phase. Instead, the process of this invention was able to produce a substantial precipitation of proteins and fats, as is evident by the large decrease in the suspended solids after the treatment.

EXAMPLE 6.6

Combined influent to a municipal sewage treatment plant.

| Parameter | Before Treatment | After Treatment | Percent (%) Removal |
| --- | --- | --- | --- |
| COD (mg/L) | 1,410 | 155 | 89 |
| $BOD_5$ (mg/L) | 585 | 90 | 85 |
| $COD:BOD_5$ ratio | 2.4:1 | 1.7:1 | |
| Suspended Solids (mg/L) | 910 | 65 | 93 |
| Color/Turbidity: | | | |
| Abs at 440 nm (yellow) | 1.92 | 0.42 | 79 |
| Abs at 500 nm (red) | 1.68 | 0.33 | 80 |
| Abs at 600 nm (blue) | 1.74 | 0.37 | 79 |
| $NO_3$—N (mg/L) | 2.5 | 0 | 100 |

-continued

| Parameter | Before Treatment | After Treatment | Percent (%) Removal |
|---|---|---|---|
| $NO_2$—N (mg/L) | 3.5 | 1.5 | 57 |
| $PO_4$—P (mg/L) | 22.6 | 7.5 | 67 |
| Phenols (mg/L) | 1.8 | 1.4 | 32 |

As is collectively demonstrated in Examples 6.1–6.6, by the simultaneous action of a complex network of chemical reactions and physical mechanisms, such as settling, a process in accordance to this invention is capable of removing a wide spectrum of dissolved and suspended carbonaceous contaminants from the aqueous phase as indicated by the substantial COD decrease after the treatment (Examples 6.1–6.3 and 6.5–6.6), increasing the fraction of readily biodegradable carbonaceous organics as suggested by the significantly lower COD:BOD ratio after the treatment (Examples 6.1, 6.3, 6.5, 6.6), removing the suspended solids (Examples 6.1–6.6), colour (Examples 6.1, 6.2, 6.4, 6.6), odour (Example 6.1), halogenated organics (AOX) (Example 6.2), nitrite and nitrate (Examples 6.1, 6.5, 6.6) and phosphate (Examples 6.1, 6.2, 6.3, 6.5 and 6.6). Of particular importance is the high process efficiency in removing all the above pollutants many of which are quite difficult to remove, thus, requiring special treatment (e.g., colour, AOX, nitrite and nitrate, phosphate etc.). In addition, the process is capable of removing with a high efficiency (50–90%) phenols which are quite difficult to treat by biological methods due to their toxicity to most microorganisms and are, thus, regulated quite strickty in most areas around the world.

EXAMPLE 7

The combined process water effluent from a newsprint mill using 100% recycled paper as a starting material after primary treatment by standard drum filtration has been treated further by a process according to this invention at three different pH values during the reaction stage.

Three 200-mL samples of the given wastewater were placed in identical vessels each containing 200 g of iron shavings mixed with 100 g of copper shavings. The pH in the first vessel was adjusted to 5.5, in the second to 7 and in the third to 10.5. The three vessels were capped and shaken for 5 min after which the pH of the solution in each of them was adjusted to 8 and the treated samples were allowed to stand for 20 minutes, whereupon sedimentation occurred. At the end of the settling period, the supernatant layer of the three samples was analyzed yielding the following results:

| Parameter | Untreated sample | Reaction at pH = 5.5 Value | Reaction at pH = 5.5 (%) removal | Reaction at pH = 7.0 Value | Reaction at pH = 7.0 (%) removal | Reaction at pH = 10.5 Value | Reaction at pH = 10.5 (%) removal |
|---|---|---|---|---|---|---|---|
| COD (mg/L) | 1,656 | 800 | 52 | 900 | 46 | 1,120 | 33 |
| $BOD_5$ (mg/L) | 380 | 284 | 26 | 277 | 27 | 325 | 15 |
| COD:$BOD_5$ | 4.4:1 | 2.8:1 | — | 3.2:1 | — | 3.5:1 | — |
| Color/Turbidity: Abs at 440 nm | 1.26 | 0.00 | 100 | 0.55 | 57 | 0.88 | 30 |

As is evident, irrespective of the pH value employed during the reaction phase, the treatment in accordance with this invention is able to remove a substantial farction of the COD, BOD and color present in the untreated waste water and to decrease the COD:BOD ratio that is, in other words, to increase the fraction of the easily biodegradable pollutants in the waste water. In fact, the treatment efficiencies observed are unexpectedly high considering that the initial sample utilized was pretreated by drum filtration which had already removed the largest fraction of the suspended solids present in the raw effluent which contribute heavily to the measured COD (suspended solids in raw effluent=1,450 mg/L and after drum filtration=260 mg/L). Thus, in this particular example, the process of this invention has acted upon mainly dissolved pollutants.

EXAMPLE 8

The process water effluent from a medium density fibreboard (MDF) manufacturing plant (COD=12,710 mg/L) was treated by a process according to this invention utilizing three different contact times during the reaction stage.

Three 200-mL samples of the given wastewater were placed in identical vessels each containing 200 g of iron shavings mixed with 100 g of copper shavings. The three vessels were capped and shaken, the first for 5 minutes, the second for 25 minutes and the third for 1.5 hours. At the end of the contact period, the pH of the solution in the vessels was adjusted to 8 and the treated samples were allowed to stand for 20 minutes to allow for solid separation by means of sedimentation. At the end of the settling period, the supernatant layer of the three samples was analyzed yielding the following results:

| Vessel No. | Contact Time | Final COD (mg/L) | Percent (%) COD removal |
|---|---|---|---|
| 1 | 5 min | 6,090 | 52 |
| 2 | 25 min | 5,303 | 58 |
| 3 | 1.5 hours | 4,395 | 65 |

As is apparent, from the above results, the treatment efficiency increases, as expected, with the contact time employed in the reaction phase. Nevertheless, COD removal efficiencies higher than 50% are obtained even at very short contact times which is, in fact, surprising considering that contact times employed for reduction and/or coagulation by iron in its metallic or ionic form in the absence of a metal promoter are typically on the order of hours or days. This is of great importance to the engineering of industrial-scale applications since the process may be implemented in smaller and much more versatile plant configurations.

EXAMPLE 9

The raw effluent from a newsprint mill using 100% recycled paper as a starting material (COD=2,890 mg/L) was treated by a process according to this invention by employing three different iron:catalyst ratios during the reaction stage.

The pH of the waste water was first adjusted to 10.5. Subsequently, three 200-mL samples were placed in identical vessels each containing 200 g of iron shavings mixed with a different quantity of copper shavings, such that the Fe:Cu ratio was 1.3:1 w/w in the first vessel, 2:1 w/w in the second and 4:1 w/w in the third one. The vessels were then capped and shaken for 5 minutes. At the end of the contact period, the pH of the solution in the vessels was adjusted to 8 and the treated samples were allowed to stand for 20 minutes to allow for solid separation by means of sedimentation. At the end of the settling period, the supernatant layer of the three samples was analyzed yielding the following results:

| Vessel No. | Fe:Cu | Final COD (mg/L) | Percent (%) COD removal |
|---|---|---|---|
| 1 | 1.3:1 w/w | 393 | 87 |
| 2 | 2:1 w/w | 383 | 87 |
| 3 | 4:1 w/w | 385 | 87 |

As is apparent, from the above results, irrespective of the iron:promoter ratio employed during the reaction, the observed COD removal efficiency at the end of the treatment is the same. Thus, the treatment efficiency is not limited by the iron:promoter ratio employed which, in fact, supports the theory about the promoter ie catalytic function of the promoter metal in the system.

IV. Process Implementation to Enhance Downstream or Parallel Biological Treatment This class of examples demonstrates the use of the proposed treatment in conjunction with aerobic biological degradation downstream or in parallel and discusses the advantages of implementing a combination of them for the full treatment of industrial wastewaters of different origin.

EXAMPLE 10

The effluent treatment plant in a food processing plant manufacturing among others several dairy products consists of an equalization tank followed by conventional biological treatment accomplished in an activated sludge line consisting of a 85-$m^3$ aeration tank followed by a 15-$m^3$ sedimentation tank. The treatment plant has operated at its maximum capacity of 10 $m^3$/day for a number of years with an average incoming waste water quality of COD=3,800 mg/L BOD=430 mg/L producing an average effluent quality of COD=65 mg/L BOD=50 mg/L.

A recent upscale in the production of the plant resulted in the doubling of the waste water flow rate directed to the effluent treatment plant to 20 $m^3$/day. Since the plant was severely under-designed for the new operating flow rate, the treated waste water quality deteriorated substantially and, in fact, the treatment could not meet the local effluent consent limits for disposal into a nearby river any longer.

In order to solve the problem, a process in accordance with this invention was retrofitted into the existing treatment plant to provide a pre-treatment of the incoming waste water prior to biological treatment. The pre-treatment was accomplished by installing a 1.5-$m^3$ tower containing a mixture of iron and copper shavings next to the equalization tank and recycling the liquor from the latter through the tower at rate of 6 $m^3$/h. The effluent from the equalization tank was directed to a settling tank to separate the solids produced and the clarified stream was then fed into the existing biological treatment stage. The application of this waste water pre-treatment resulted in the removal of 60% of the incoming COD load prior to the biological treatment stage and the final effluent quality produced by the plant was COD=50 mg/L BOD=40 mg/L which was once again below the effluent consent limits and, surprisingly, slightly better than that accomplished previously with half the influent flow rate.

In conclusion, the retrofit of a process in accordance with this invention into an underperforming effluent treatment plant to provide chemical pre-treatment prior to biological treatment allowed for doubling the rate of waste water inflow to the plant while, at the same time, producing similar and, in fact, somewhat better treated effluent quality without resorting to space-consuming and more expensive extensions of the existing biological treatment stage. In this particular industrial-scale embodiment of this invention, the process configuration consisted only of a reactor followed by a settling tank, that is only Stage 2 in FIG. 1, where, in fact, the reaction tank was substituted by the existing equalization tank of the plant.

It should be noted that the particular waste water treated in this Example is that discussed earlier under Example 6.5, the difference between the two examples being the scale of applications, that bench-scale (Example 6.5) versus real industrial-scale (present Example). In comparison to the successful application of this invention, the application of standard Fe(II) treatment in the particular waste water treatment application had a negligible effect on the suspended solids which comprised mainly protein and fat conglomerates in suspension.

EXAMPLE 11

Rather than being employed as a pre-treatment prior to biological treatment, this invention may be used at some point within an existing biological treatment line to provide a chemical pre-treatment in parallel to biological degradation.

In a series of pilot-plant continuous-flow studies, the process water effluent from a plywood and particle board manufacturing plant after primary clarification by sedimentation was treated in a full conventional biological treatment line consisting of denitrification, activated sludge/ clarification, nitrification and, finally, sand filtration where an anaerobic denitrifying culture had been allowed to grow over time.

The same studies were repeated under identical operating conditions after installing a tower containing a mixture of iron and copper shavings inside the dentrification tank and recycling continuously the liquor in the tank through the tower to provide simultaneous chemical and biological treatment. The quality of the final effluent coming out of the sand filter with and without the chemical treatment tower present in the denitrification stage is compared to that of the influent stream in the following Table:

| Parameter | Influent pre-clarified waste water | Denitrification tank/only biological treatment | Denitrification tank/parallel biological & chemical treatment | Final effluent/ only biological treatment | Final effluent/ parallel biological & chemical treatment |
|---|---|---|---|---|---|
| COD (mg/L) | 4,500 | 3,148 | 2,675 | 900 | 400 |
| $BOD_5$ (mg/L) | 2,790 | 28 | 70 | 6 | 5 |
| $NH_4$—N (mg/L) | 80 | 480 | 535 | 270 | 35 |

-continued

| Parameter | Influent pre-clarified waste water | Denitrification tank/only biological treatment | Denitrification tank/parallel biological & chemical treatment | Final effluent/ only biological treatment | Final effluent/ parallel biological & chemical treatment |
|---|---|---|---|---|---|
| Phenols (mg/L) | 38 | 29 | 26 | 15 | 0.5 |

It is apparent from these results that the incorporation of a process in accordance to this invention into an existing conventional treatment plant to provide simultaneous chemical and biological degradation of the pollutants present in the incoming waste water results in a significant improvement of the final effluent quality produced by the plant. In particular, the removal of phenols and $NH_4$-N which are specifically targeted and strictly regulated pollutants commonly requiring special treatment is overwhelmingly higher by the incorporation of this invention into a conventional biological treatment method than by the latter alone.

In this particular embodiment of this invention, the process configuration implemented was the simplest possible consisting merely of a reaction tower. The nitrification tank served as the reaction tank. In addition, because the influent waste water stream was pre-clarified by classical primary settling, the extra non-biological sludge burden produced by the incorporation of the chemical treatment into the biological treatment sequence was marginal compared to the biological sludge in the system, thus, not requiring the incorporation of an additional clarifier in the existing treatment sequence.

EXAMPLE 12

Paper manufacturing involves the use of extremely large water quantities typically ranging from 40 to 73,000 m³/day. Fresh water used in the production is typically taken from nearby rivers or lakes which, at the same time, also accept the process water effluent from the production lines of the same plants. As a result, recycling process water after an intermediate treatment becomes paramount to this industry in order to minimize operational costs associated with the supply of fresh water and at the same time alleviate the pollution of such bodies of water which serve as fresh water sources for their production. Water treatment for the purpose of recycling typically involves expensive treatment technologies such as reverse osmosis and adsorption.

A 200-L sample of the raw process water effluent from a newsprint mill utilizing 100% recycled paper as a starting material was allowed to stand for several hours to accomplish a primary clarification by means of solid sedimentation. The sample was then fed at a rate of 0.5L/h to a pre-treatment in accordance to this invention in a configuration identical to that shown in FIG. 1 and then on to a conventional biological treatment line involving denitrification, activated sludge/clarification, nitrification and, finally, sand filtration where an anaerobic denitrifying culture had been allowed to grow over time. Each of the four tanks (two reactors and two settling tanks) shown in FIG. 1 had a volume of 4 L, while the tower in the main reaction tank was 1 L and contained approx. 600 g of iron shavings mixed with 200 g of copper shavings. The results of the fill treatment obtained are shown in the following Table:

| Parameter | Raw waste water | Primary clarification by settling | Process According to Invention | Secondary treatment |
|---|---|---|---|---|
| pH | 7 | 7 | 8.5 | 8.1 |
| COD (mg/L) | 3,040 | 1,100 | 716 | 70 |
| $BOD_5$ (mg/L) | 324 | | 260 | 7 |
| $COD:BOD_5$ | 9.4:1 | | 2.7:1 | 10:1 |
| SS (mg/L) | 1,450 | 220 | 50 | 10 |
| Color/Turbidity: Abs at 440 nm | 2.37 | | 0.47 | 0.05 |
| $NO_2$—N (mg/L) | 1.4 | | 0.5 | 0.4 |
| Phenols (mg/L) | 19.5 | | 3.7 | 0.15 |

As is evident, the implementation of a pre-treatment according to this invention in a conventional effluent treatment plant (primary clarification followed by secondary treatment) between the primary clarifier and the secondary biological treatment allows the system to produce an extremely high-quality effluent water which can actually be recycled into the production. In this way there is no need for energy intensive and generally more expensive final effluent polishing techniques commonly applied to permit the recycling of the water effluent from the biological treatment stage.

What is claimed is:

1. A process for the treatment of waste water containing suspended solid matter in particulate and/or colloidal form and also containing dissolved contaminants including reducible macromolecular organic compounds of complex structure, which comprises the steps of (a) contacting the waste water with iron in a form selected from the group consisting of solid metal, ferrous irons and Fe(II)-containing natural minerals, which contact is in the presence of a promoter metal which promotes the rate of electron transfer from iron to the dissolved contaminants to chemically reduce said contaminants and to produce ferric ions and coagulated suspended solid matter and (b) subsequently separating from the aqueous phase at a pH between 7 and 8.5 suspended solid matter including the coagulated solids formed during step (a) and solids originally present in the waste water, and in which process the waste water is subjected to biological treatment selected from the group consisting of aerobic and anaerobic biological treatments either simultaneously with treatment step (a) or subsequent to step (b).

2. A process according to claim 1, wherein the solid metallic iron is in the form of shavings, trimmings, filings, scrap, powder, pills, pellets or any other form of regularly or irregularly shaped porous or non-porous particulate iron.

3. A process according to claim 1, wherein the metal promoter is one of copper, silver, nickel, gold, platinum or palladium.

4. A process according to claim 1, wherein the metal promoter is used in the form of metal in particulate form in contact with iron or with ferrous ions or as a metal layer deposited on the surface of metallic iron.

5. A process according to claim 1, wherein the metal promoter is used in the form of a sulfide, oxide or other insoluble compound containing the promoter metal element.

6. A process according to claim 1, in which a stream of waste water undergoes a pre-treatment with ferrous and/or ferric ions in the presence of a promoter metal prior to being contacted with metallic iron in the presence of a promoter metal.

7. A process according to claim 6, wherein the ferrous and/or ferric ions are derived from the effluent from the reaction with elemental iron in the presence of a promoter metal.

8. A process according to claim 1, wherein the water is municipal sewage.

9. A process according to claim 1, wherein the water is from the paper and pulp industries, wood or wood-based panel industries, dyestuff treatments, fiber and textile industries, tanneries, production of natural or synthetic lubricants or petroleum based industries or edible oil production plants.

* * * * *

UNITED STATES PATENT AND TRADEMARK OFFICE
CERTIFICATE OF CORRECTION

PATENT NO. : 6,322,701 B1
DATED : November 27, 2001
INVENTOR(S) : Andreas Th Delighiannis It is certified that error appears in the above-identified patent and that said Letters Patent is hereby corrected as shown below:

Title page,
Item [30], "GR" should read -- GB --.

Signed and Sealed this

Sixteenth Day of April, 2002

Attest:

Attesting Officer

JAMES E. ROGAN
Director of the United States Patent and Trademark Office